Nov. 25, 1958 P. R. R. AIGRAIN ET AL 2,862,059

MULTIPLEX SWITCHING MEANS

Filed Feb. 15, 1954

Inventors
P. R. R. AIGRAIN
S. VAN MIERLO
By Robert Harding Jr.
Attorney

United States Patent Office 2,862,059

Patented Nov. 25, 1958

2,862,059

MULTIPLEX SWITCHING MEANS

Pierre Raoul Roger Aigrain, Paris, France, and Stanislas Van Mierlo, Antwerp, Belgium, assignors to International Standard Electric Corporation, New York, N. Y., a corporation of Delaware Application February 15, 1954, Serial No. 410,400

Claims priority, application Netherlands March 12, 1953

5 Claims. (Cl. 179—18)

Figures 1, 2:
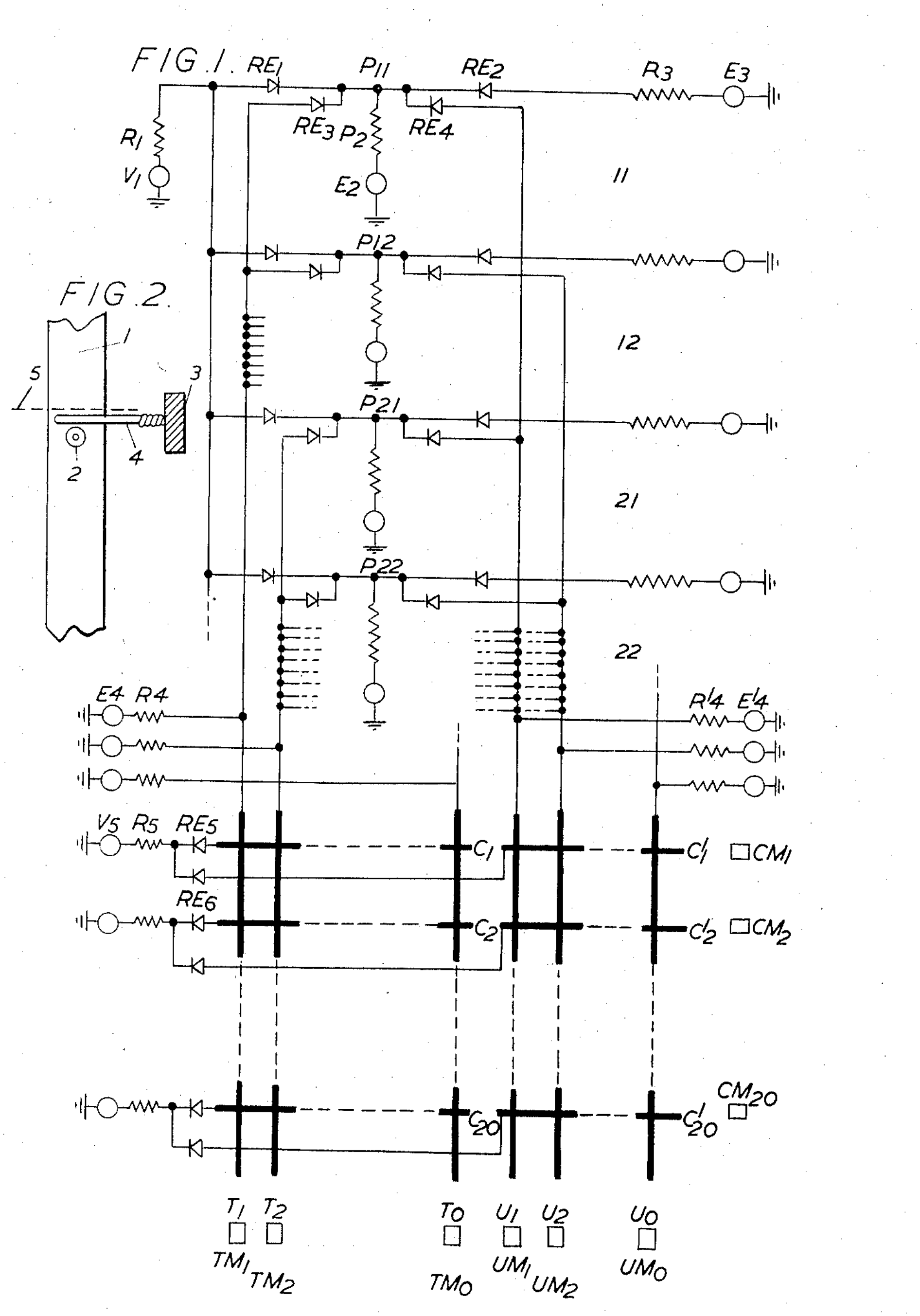

The invention relates to multiplex switching means and more particularly the control thereof.

In the U. S. Patent No. 2,535,303, an electronic switch has been disclosed permitting to establish connections between an inlet and a plurality of outlets on a time multiplex basis. In other words, during short intervals of time e. g. 100 microseconds, the inlet will be successively connected to one or more of the outlets and such connections will be repeated in the same cycle during every succeeding short interval of time. For example, within a period of 100 microseconds, 5 microseconds periods might each be allotted for recurrent connections between the inlet and any particular outlet, so that a maximum of 100/5=20 connections can simultaneously be established between the inlet and 20 particular outlets, and in a telecommunication system using such multiplex switching means, 20 simultaneous connections could be established through the switch without interference between one another provided suitable precautions are taken.

In the Belgian Patent No. 502,518 (S. Van Mierlo 41), a method of controlling such multiplex switching means has been shown, more particularly with respect to the use of such a multiplex switch as a line selector in a telephone system. It is evident that since any connection between the inlet of the multiplex switch and an outlet is repeatedly interrupted at a particular rate, some recording means should be available in order to give the identity of the outlet so that a connection can be re-established every time to that particular outlet the identity of which has been recorded. In relation to a multiplex line selector for example, one will have to record the identities of the various calling lines so that this selector can be repeatedly set on the various calling lines, the maximum number of simultaneous calls to be handled through the multiplex being, of course, determined by the maximum number of time channels available within the repetition period, e. g. 100/5=20.

In the said Belgian patent, a recording and control arrangement is disclosed wherein the identity of each calling line is recorded in binary form using one gas tube for each binary digit. Each gas tube has a rectifier gate associated with it and said gate which is normally blocked can only be unblocked when the associated gas tube is fired and when a pulse is simultaneously issued from a pulse generator which delivers channel pulses of e. g. 5 microseconds duration within a period of 100 microseconds. The unblocking of a combination of such gates during a particular interval of 5 microseconds leads to a connection being established between the common inlet of the multiplex switch and the particular outlet leading to the calling line and the number of which corresponds to the particular combination of fired gas tubes which together with a particular channel pulse are responsible for the unblocking of the corresponding line gates.

The amplitude of the pulses and consequently the resulting current flowing between the common inlet and any outlet will, however, be found rather considerable. The amplitude of the control current flowing through said rectifier gate will be a function of the former and, in fact, will be equal to several times the former. In practice this means that the rectifiers used as control gates for the multiplex switch will be of a high power rating and therefore expensive. Furthermore, the gas tube also controls the current flowing through the rectifier gate, and in turn, this means that the power rating of the tube will also have to be fairly high, resulting in an increased cost for the system since a large number of such gas tubes and rectifier gates is necessary. In the said Belgian patent, and in order to avoid this drawback, buffer amplifying means have been interposed between the gas tubes constituting the recording means and the rectifier gates on the one hand, and the multiplex switching means on the other, whereby the gas tubes and the rectifier gates need no longer carry a very high current. It means, however, that the additional device, i. e. the buffer amplifiers, has to supply high current and therefore this additional part of the system also constitutes an expensive item.

An object of the invention is to notably simplify and reduce the cost of both the recording devices and gates used in conjunction for the control of multiplex switching means.

A further object of the invention is to use a single means to replace the means for recording the identity of an outlet and the rectifier gates, which permits this identity recording means to control the setting of the multiplex switching means on the said outlet.

A characteristic feature of the invention is, in relation to a multiplex switching means with an inlet, a plurality of outlets, a plurality *m* of control leads, *n* electrical pulse generators each delivering equal and recurrent pulses at the same rate but in such a way that during any time interval defined by any pulse of said generators none of the other generators issue pulses, *n* electrical recording means for each of said control leads and connecting means to simultaneously interconnect any number of said *n* generators each to a different set of said control leads determined by the energized condition of the corresponding recording means thereby establishing recurrent connections between said inlet and the outlets corresponding to the energized sets of control leads, to provide a crossbar switch with *m* select bars corresponding with the *m* control leads, with *n* hold bars corresponding with the *n* generators and with *mn* contacts corresponding with the said connecting and recording means, whereby the operation of one or more select bars in conjunction with the operation of a particular hold bar will result in pulses from the generator corresponding thereto being applied to the control leads corresponding to the operated select bars through corresponding contacts of said crossbar switch.

The above mentioned and other objects and features of the invention will become more apparent and the invention itself will be best understood by referring to the following description of an embodiment taken in conjunction with the accompanying drawings which represent:

Fig. 1, a preferred embodiment of the invention;

Fig. 2, part of a crossbar switch in accordance with the invention.

Referring to Fig. 1, a 100-point multiplex switch has been represented, by way of example, this being a common capacity but only 4 of the outlets are shown. The inlet is represented by a source of voltage $V_1$ together with a source resistance $R_1$. It can be connected to any out of the 100 outlets numbered from 11 to 00, and four of which only, 11, 12, 21, 22, are shown. A connection to the outlet such as 11 occurs via the two oppositely poled rectifiers $RE_1$ and $RE_2$. When these are made to conduct, a path is established between $V_1$ and $E_3$ through the source resistance $R_1$, the series rectifiers $RE_1$ and $RE_2$, and the load resistance $R_3$ of outlet 11. Source $E_3$ can be assumed to be a suitable biassing potential. At point $P_{11}$ where the cathodes of the rectifiers $RE_1$ and $RE_2$ are connected, two additional rectifiers $RE_3$ and $RE_4$ have also their cathodes connected thereat. Rectifier $RE_3$ leads to a constant D. C. source $E_4$ via resistance $R_4$ and rectifier $RE_4$ leads to a similar but separate arrangement $E'_4/R'_4$. Point $P_{11}$ is further connected to a D. C. source of constant potential $E_2$ via resistor $R_2$. Potential $E_4$ is chosen higher than potential $E_2$ whereby the rectifiers $RE_3$ and $RE_4$ are normally made to conduct and afford a relatively low impedance. The resulting potential at $P_{11}$ is arranged to be higher than $V_1$ and $E_3$, whereby rectifiers $RE_1$ and $RE_2$ are non-conductive and, provided the eventual variations of $V_1$ remain within a suitable range, no current function of $V_1$ will be able to flow through resistance $R_3$. In order to afford a connection between $V_1$ and $E_3$, the potential at the junction point of $R_4$ and $RE_3$ as well as the potential at the anode of rectifier $RE_4$ should be so lowered that these rectifiers are no longer able to conduct and therefore point $P_{11}$ becomes decoupled from the $E_4$ and $E'_4$ sources to which it was previously connected. Provided $E_2$ is chosen lower than $V_1$ and $E_3$, rectifiers $RE_1$ and $RE_2$ will become conductive and a new potential will be established at point $P_{11}$ resulting from the current now flowing through the rectifiers $RE_1$ and $RE_2$ which means that the common inlet is through connected to outlet 11.

It will be appreciated from the figure that access from the common inlet to the other outlets and in particular 12, 21 and 22, is obtained in exactly the same way as described in relation to outlet 11. A decimal control scheme has been adopted whereby all outlets having the same tenth digit have their rectifiers such as $RE_3$ connected to the same $E_4$ sources, while those outlets having the same units digit have their rectifiers such as $RE_4$ connected to the same $E'_4$ source. Therefore, for a hundred outlets, a total of ten $E_4$ and ten $E'_4$ sources is necessary, six of which have been shown.

A crossbar switch has been schematically represented in the lower part of Fig. 1. This switch comprises a series of 20 vertical conductors: $T_1, T_2 \ldots, T_0$ and $U_1, U_2 \ldots, U_0$. In addition, 20 pairs of horizontal conductors: $C_1/C'_1, C_2/C'_2 \ldots, C_{20}/C'_{20}$ are provided and additional means not shown are provided to establish contact between any of the 20 vertical conductors and one or the other conductor out of any of the 20 pairs of horizontal conductors. Only the electromagnets of the crossbar switch permitting to operate these means have been shown schematically, i. e. $TM_1, TM_2, \ldots, TM_0, UM_1, UM_2, \ldots, UM_0$ and $CM_1, CM_2, \ldots, CM_{20}$. It will be assumed that the operation of any pair of magnets of the TM and UM series, one from each, followed by the operation of a particular magnet of the CM series and thereafter by the release of the operated magnets of the TM and UM series, will result in contacts being established and maintained between the horizontal conductors corresponding to the operated CM magnet and the vertical conductors corresponding to the operated TM and UM magnets. It will be noted, that there are two horizontal conductors for each magnet of the CM series, i. e. $C_1$ and $C'_1$ for magnet $CM_1$.

Assuming it is desired to establish a connection to outlet 11, magnets $TM_1$ and $UM_1$ will first be operated and this will be followed by the energization of any magnet of the CM series. Assuming that magnet $CM_1$ is energized, the voltage source $V_5$ will now be applied to the anodes of the rectifiers $RE_3$ and $RE_4$ respectively via conductors $T_1$ and $U_1$, the conductors $C_1$ and $C'_1$, rectifiers $RE_5$ and $RE_6$, and jointly via resistor $R_5$. As long as the potential which normally prevails at the point $P_{11}$ and at all other similar points, is lower than that of the source $V_5$, the rectifiers $RE_5$ and $RE_6$ which have their cathodes connected towards the source $V_5$, cannot conduct and therefore decouple the source $V_5$ from the vertical conductors.

If the potential of $V_5$ is variable and is suddenly lowered (negative pulse) to a value $V'_5$ which is sufficiently lower than $E_4$, more current will be drawn from the sources $E_4$ and $E'_4$ respectively connected to the vertical conductors $T_1$ and $U_1$ via the rectifiers $RE_5$ and $RE_6$ which become conductive, than via a series of ten rectifiers such as $RE_3$ and a series of ten rectifiers such as $RE_4$. Therefore, the potentials at the conductors $T_1$ and $U_1$ will be brought down to a value which no longer permits rectifiers $RE_3$ and $RE_4$ to conduct, whereby these will now afford a high impedance, and rectifiers $RE_1$ and $RE_2$ will be able to conduct thereby establishing a connection between the common inlet and outlet 11.

By using twenty sources $V_5$, each connected in a similar manner to a pair of horizontal conductors such as $C_1/C'_1$, it will be possible to operate the 100-point electronic switch in a multiplex manner. For example, each source $V_5$ can deliver negative pulses of 5 microseconds duration within a period of 100 microseconds and the pulses from each $V_5$ source can be so staggered with respect to one another that when one source issues a 5 microsecond pulse, all the remaining 19 sources are at their normal level.

As soon as a connection is established between conductors $T_1$ and $C_1$ and $U_1$ and $C'_1$, every time the source $V_5$ issues a negative pulse, rectifiers $RE_5$ and $RE_6$ will become conductive and in the manner explained above a connection will be established between $V_1$ and $E_3$. This connection will therefore be repeated every 100 microseconds. At the same time, other magnets of the CM series might operate whereby connections are also established between other horizontal conductors and other vertical conductors. Assuming that, in order to prepare also a connection to outlet 12, magnets $TM_1$ and $UM_2$ have been operated in conjunction with magnet $CM_2$, a connection is also established between conductor $T_1$ and conductor $C_2$ on the one hand, and between conductor $U_2$ and $C'_2$ on the other.

Provided that the potential which prevails on conductor $T_1$, when the $V_5$ source connected to conductors $C_1$ and $C'_1$ has the lower potential which permits rectifiers $RE_5$ and $RE_6$ to become conductive, is lower than the potential normally supplied by the $V_5$ sources and in particular that connected to the conductors $C_2$ and $C'_2$, the rectifiers which afford the latter connections will remain non-conductive. This means that at the time the $V_5$ source connected to conductors $C_1$ and $C'_1$ drops its potential, only the ten rectifiers such as $RE_3$ connected to conductor $T_1$ and the ten rectifiers such as $RE_4$ connected to conductor $U_1$, will become non-conductive $U_2$ remain conductive. In other words, the unblocking of the selector towards outlet 11 will not be accompanied at the same time by a simultaneous setting on the outlet 12. This latter connection will only occur when the $V_5$ source connected to the conductors $C_2$ and $C'_2$ will drop its potential and at no other moment. Therefore, it is possible to have as many as 20 simultaneous multiplex connections to 20 arbitrary outlets out of the 100.

Although the 100-point multiplex switch described above is shown to be controlled by means of a duo-decimal code, i. e. a $C^{10}{}_1C^{10}{}_1$ code, this is not the only way, and other codes can be used, such as the $C^4{}_1C^5{}_1C^5{}_1$ code which necessitates only 5+5+4=14 control leads but which means that access to each outlet has to be controlled by 1+1+1=3 control leads instead of 2 for the $C^{10}{}_1C^{10}{}_1$ code. A $C^5{}_2C^5{}_2$ code can also be used, in which only 5+5=10 control leads are necessary but in which the access to any outlet necessitates the use of 2+2=4 control leads, unless there is an intermediate translating network between the crossbar switch shown in Fig. 1 and the gates which constitute the multiplex switching means. Yet another code would be the $C^{10}{}_3$ one, which necessitates only 10 control leads and each gate of the multiplex switch is controlled by 3 control leads only. All the codes envisaged above are of the type where each combination always means a constant number of energized elements since such arrangements are easier to control electrically.

The codes where only one out of a group of control leads is energized at a time are advantageous in that they only require decoupling means such as $RE_5$ per group of control leads only. The $C^5{}_2C^5{}_2$ code for example would on the other hand, have the disadvantage that, irrespective of the fact that two groups of control leads are used, it would necessitate a rectifier per control lead, i. e. 10 rectifiers for each $V_5$ source instead of only 2 with the $C^{10}{}_1C^{10}{}_1$ arrangement shown in Fig. 1.

Fig. 2 shows an example of how a crossbar switch of standard design can be modified to be used in accordance with the electrical arrangement of Fig. 1 and at cheaper cost. Instead of using a set of select bars, a set of hold bars and contact operating means at each intersection of a select bar with a hold bar, so that these means can effect a connection between a conductor such as $C'_1$ and another such as $U_1$ (Fig. 1), it is the select and hold bars which are themselves carrying the current and which are therefore used also as conductors.

This can be achieved for example as shown in Fig. 2, where part of a select bar 1 has been shown. Such a select bar is provided with a plurality of projections 2, one of which is shown, with a frusto-conical shape. Hold bars such as 3 are shown in cross-sectional view since, whereas the select bar 1 shown is arranged as a vertical bar, the hold bar 3 is in the horizontal direction. On the said hold bar 3, rodlike spring extensions such as 4 are mounted at regular intervals along the length of the bar so that one resilient extension 4 corresponds to a pin such as 2. The extensions normally project above said pin and are located at a distance from the select bar 1 which is greater than the length of the pin 2. All the elements shown should be made of materials possessing good electrical conductivity properties.

When it is desired to effect an interconnection between the select bar 1 and the hold bar 3, the former will be lifted vertically by any suitable magnet means (not shown), the displacement being such that the axis of the pin 2 will now come to a position exactly level with the dotted line 5. Then, the hold bar 3 can be displaced longitudinally also, along the direction perpendicular to the plane of the paper, so that the spring extension 4 will be driven along the sides of the pin 2, whereby contact will now be established between the select bar 1 and the hold bar 3. As soon as this contact has been established, the select bar 1 can now be released and return to its original position. In so doing, the spring extension 4 will be bent downwards and will keep in contact with the pin 2 provided, of course, that the means which have brought the hold bar 3 to its actuated position remains operated. When these are released, the connection is broken.

In this manner, the crossbar switch necessary for the control of the multiplex switching means can be extremely simplified with respect to standard designs and further, provided the hold bar such as 3 is insulated at the middle of its length, it can be used to replace the pair of electrical conductors $C_1$ and $C'_1$ shown in Fig. 1, since then two electrically distinct conductors are available, the first of which can be connected to the anode of rectifier $RE_5$ and the second to the anode of rectifier $RE_6$. If more than two groups of control leads are to be provided, the hold bars will of course, be split electrically into as many electrically distinct portions as there are groups of control leads.

It will be realized that although multiplex switching means of the type shown in the U. S. Patent No. 2,535,303 have been shown on Fig. 1, the control arrangement can also be applied to the control of multiplex switching means of other design. For example, the rectifiers such as $RE_3$ and $RE_4$ could be replaced by resistances of suitable values. In this case, the sources $E_4$ would become redundant since they serve to make the rectifiers such as $RE_3$ and $RE_4$ conductive when access to the corresponding outlet such as 11 has to be prevented. Then, of course, the potential of $E_2$ should normally be chosen so that it is higher than the potential of the $V_1$ and $E_3$ sources and lower than the potential of the $V_5$ sources when the latter are at their normal level. Upon a suitable decrease in the potential of the $V_5$ source, the flow of current through the rectifiers $RE_5$ and $RE_6$ when these become conductive should be sufficient to decrease the potential at $P_{11}$ to a value such that rectifiers $RE_1$ and $RE_2$ can become conductive whereby a connection would be afforded between the common inlet and outlet 11.

While the principles of the invention have been described above in connection with specific apparatus, it is to be clearly understood that this description is made only by way of example and not as a limitation on the scope of the invention.

We claim:

1. Multiplex switching system comprising an inlet, a plurality of outlets, a plurality of electronic gates between said inlet and the respective outlets there being one gate for each outlet, a cross-bar switch provided with *m* select bars and *n* hold bars and with *mn* contact means one at each crossing point of said select and hold bars, magnets for actuating said select bars, magnets for actuating said hold bars, *n* sources of equal length timed electric pulses the pulses of each source being staggered with respect to the others so as to occur in different time intervals, control wires extending from said select bars to said electronic gates, and connections extending from said sources of electric pulses to said hold bars.

2. Multiplex switching system comprising an inlet, a plurality of outlets, a plurality of electronic gates between said inlet and the respective outlets there being one gate for each outlet, a cross-bar switch provided with *m* select bars and *n* hold bars and with *mn* contact sets one at each crossing point of said select and hold bars, magnets for actuating said select bars, magnets for actuating said hold bars, *n* sources of equal length timed electric pulses the pulses of each source being staggered with respect to the others so as to occur in different time intervals, control wires extending from said electronic gates and multipled to the respective vertical columns of contact sets, and connections from said pulse sources multipled to the respective horizontal rows of contact sets.

3. Multiplex switching system according to claim 1 in which said hold bars and select bars are each divided into a plurality of groups, the pulse sources are connected to the contact means in the corresponding horizontal rows of each group over separate conductors including decoupling means, and said control wires are divided into a plurality of groups the wires of each group being connected to the contact means in vertical columns of the respective groups and to a fraction of the number of electronic gates.

4. Multiplex switching system according to claim 1 in which said electronic gates comprise normally blocking rectifiers which are rendered conductive by said pulses applied over said control wires.

5. Multiplex switching system according to claim 2 wherein said select and hold bars are themselves used to conduct the currents from said pulse sources flowing through said switch when the select and hold bars are actuated.

References Cited in the file of this patent

UNITED STATES PATENTS

| | | |
|---|---|---|
| 2,620,399 | Malthaner | Dec. 2, 1952 |
| 2,667,540 | Den Hertog et al. | Jan. 26, 1954 |
| 2,694,751 | Den Hertog | Nov. 16, 1954 |
| 2,739,185 | Panzerbieter et al. | Mar. 20, 1956 |
| 2,744,162 | Den Hertog et al. | May 1, 1956 |
| 2,744,163 | Den Hertog | May 1, 1956 |